May 26, 1953     H. S. FORSBERG     2,639,737
MOTOR DRIVEN RECIPROCATING SAW
Filed July 3, 1948     2 Sheets-Sheet 1
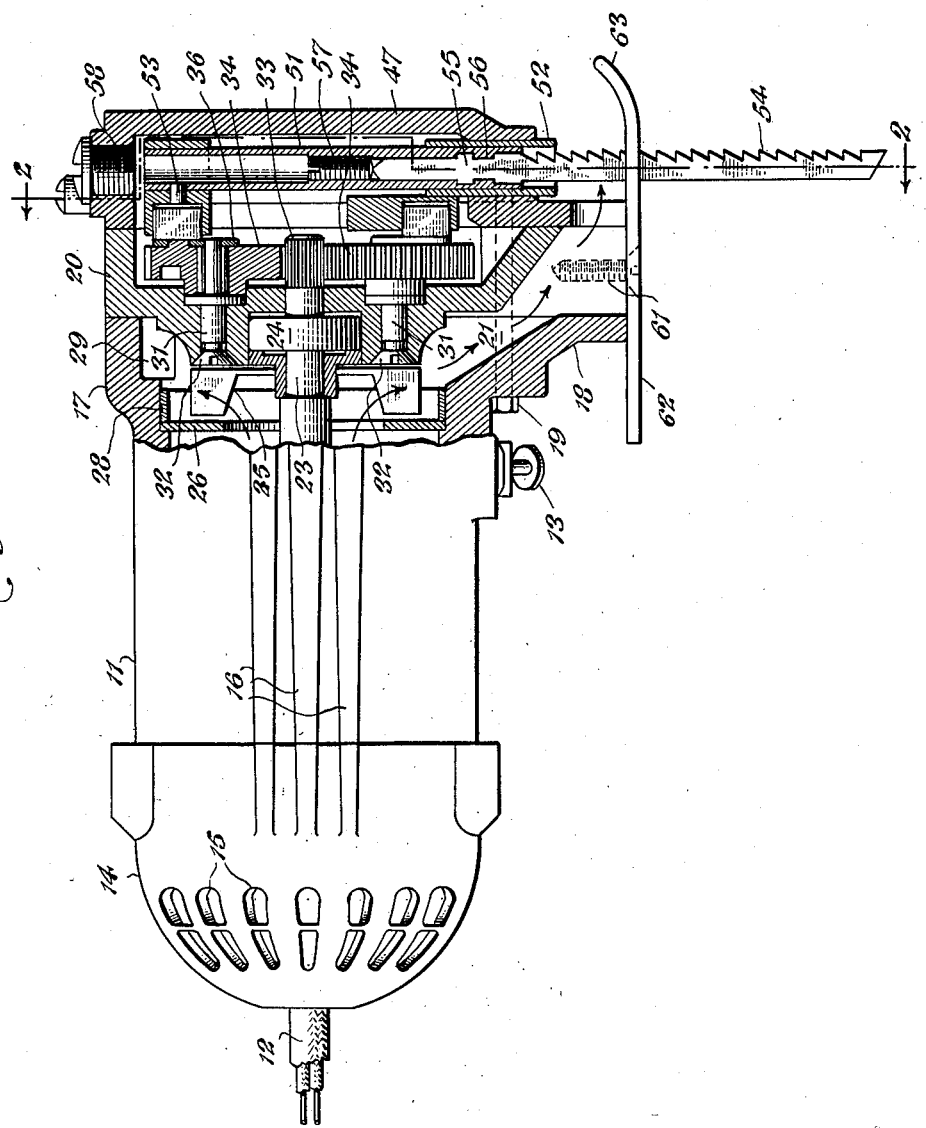
INVENTOR
HAROLD S. FORSBERG
BY
Emery, Varney, Whittemore & Dix
ATTORNEYS May 26, 1953
H. S. FORSBERG
2,639,737
MOTOR DRIVEN RECIPROCATING SAW
Filed July 3, 1948
2 Sheets-Sheet 2
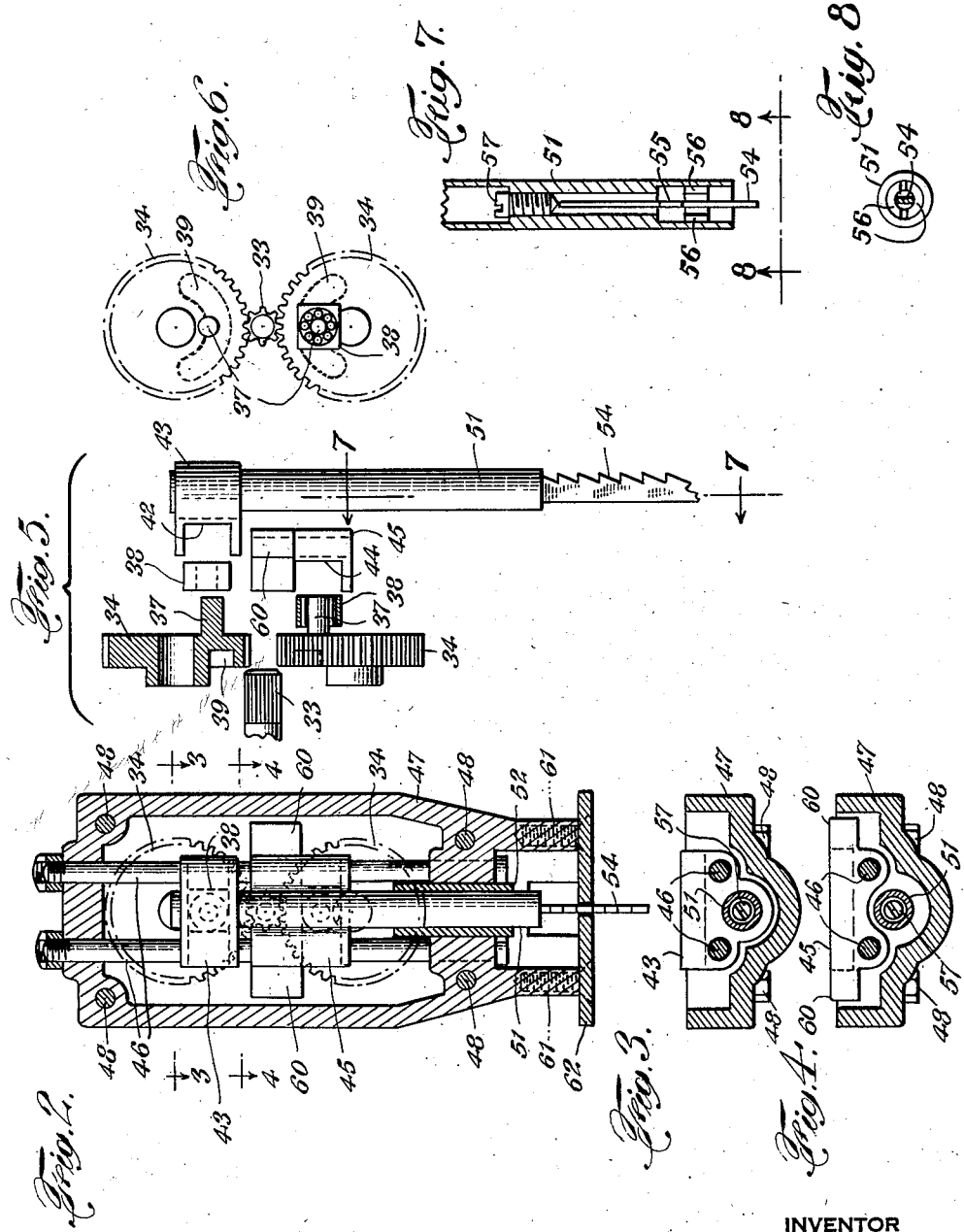
INVENTOR
HAROLD S. FORSBERG
BY
Emery, Varney, Whittemore & Dix
ATTORNEYS Patented May 26, 1953

2,639,737

UNITED STATES PATENT OFFICE 2,639,737

MOTOR DRIVEN RECIPROCATING SAW

Harold S. Forsberg, Shelton, Conn.

Application July 3, 1948, Serial No. 36,840

3 Claims. (Cl. 143—68)

This invention relates generally to motor driven saws. More particularly, the invention relates to improvements in small electric hand saws in which the saw blade, of the saber type, has a reciprocating motion, and in which the saw table moves over the material to be sawed.

It is an object of the invention to provide a ruggedly constructed electric hand saw having a reciprocating blade. It also is an object of the invention to provide a reciprocating-blade hand saw which can be used in place of a circular hand saw for cutting to a straight line with substantially equal speed and accuracy, and which has the additional advantages that it can be used for cutting to curved or irregular lines, for cutting out key holes, for lock fitting, and the like. It is a further object of the invention to provide a motor driven hand saw having a reciprocating blade in which the vibration induced by the reciprocating blade, blade holder and associated mechanism is opposed and substantially neutralized or counterbalanced by the equal and opposite movement of an equivalent mass, leaving the hand saw substantially free from vibration and thus facilitating the guiding of the saw along the desired path. Still another object is to provide a hand saw which is simple in construction and easy to assemble and to operate. Other objects and advantages of the invention will appear hereinafter.

A preferred embodiment of the invention selected for purposes of illustration and description is shown in the accompanying drawings, wherein:

Figure 1 is a side view, partly in elevation and partly in section, of a saw constructed in accordance with the invention;

Figure 2 is a vertical section through the saw substantially on the line 2—2 of Figure 1, but with the crank gear mechanism rotated 180 degrees as compared with Figure 1;

Figure 3 is a section substantially on the line 3—3 of Figure 2;

Figure 4 is a section substantially on the line 4—4 of Figure 2;

Figure 5 is an exploded view, partly in elevation and partly in section, of the pinion driving gear, crank gears, crossheads, saw ram and saw blade; and Figure 6 is an elevation showing the pinion gears on the motor shaft and the two crank gears driven thereby.

Figure 7 is a vertical sectional view taken along the line 7—7 of Fig. 5, showing the bayonet connection of the saw blade with the ram;

Figure 8 is a horizontal sectional view taken along the line 8—8 of Fig. 7.

Applicant is aware of saw attachments which can be applied to electric hand drills for the purpose of converting a drill into a saw having a blade which reciprocates along a line which is an extension of, or parallel to, the motor shaft. Applicant also is aware of various saw tools used in hobby work and of vibrator hand coping saws. None of these saws of which applicant has knowledge is intended or adapted for steady commercial usage, or is capable of replacing the electric circular hand saw. Applicant's electric hand saw, although small and light in construction, is adapted for continuous and heavy work, is comparable in utility, speed and sawing accuracy to the circular hand saw, is simple in construction, and has important uses and advantages not possible with the circular hand saw.

Referring to the drawings, and first to Figure 1, 11 is a tubular housing which encloses the electric motor. Ordinarily, the motor housing will be small enough to be held conveniently in one hand, and it may have external ribs such as 16 to prevent turning or slipping in the hand. If desired, the housing may be provided with a hand grip.

The motor itself may be of conventional type and is not illustrated. Electric current is supplied to the motor through a cord 12 and operation of the motor is controlled by a switch 13 which may be mounted in the wall of the casing 11 at any desired location for convenient actuation. The cord 12 desirably enters the housing 11 through or adjacent the rear end thereof.

The rear end of the housing 11 is closed by a cap 14, removably held in place on the housing by any suitable means. The cap 14 is provided with openings 15 for the entrance of air which will be drawn through the motor and the enclosing housing 11, for cooling and to blow sawdust clear of the saw path, by fan means to be described hereinafter.

The forward end of the housing 11 is provided at its upper edge with a flange 17 and at its lower edge with a flanged lip 18. The forward end of the housing is substantially closed by the rear wall of a gear box 20 which, in the illustrative embodiment, is secured to the housing 11 by four machine screws 19 passing through holes in the flanges 17 and 18 and engaging tapped holes in the side walls of the gear box 20.

The forward end of the motor shaft 23 extends through the rear wall of the gear box 20 and is rotatably supported therein by a suitable bearing 24. Secured on the shaft 23 so as to turn therewith, in the forward end of the housing 11, is a multi-vaned fan blade 25. Mounted transversely within the housing 11, immediately to the rear of the fan blade 25, is an air-deflecting annular partition wall 26. This partition wall may be secured within the housing, for example, pressed against a flange 27 on the inner wall of the housing, in any suitable manner, as by a holding ring 28, or by fingers projecting rearwardly from the gear box wall into the forward end of the housing 11.

When the motor is operating, the fan blade 25 will draw air lengthwise through the housing 11, the air entering through the openings 15 in the cap 14, passing through and cooling the motor, being deflected inwardly toward the motor shaft by the annular partition wall 26, and then being discharged by the fan blade from the forward end of the housing, partly through the channel 21 formed by the lip 18 and partly through one or more openings 29 in the wall of the housing. The annular wall 26 directs the air into the fan blade so that it is carried forward in sufficient volume and with enough velocity to blow sawdust away from in front of the saw when in operation.

Secured in the rear wall of the gear box 20 and projecting forwardly therefrom parallel to the motor shaft 23 are two bearing studs 31. These bearing studs may be secured in the gear box wall in any suitable manner and in the illustrative embodiment are held in the wall by screws. The bearing studs 31 are positioned diametrically opposite each other with respect to the motor shaft 23.

Rigidly secured on the forward end of the motor shaft 23 is a pinion gear 33 which meshes with two similar crank gears 34 rotatably mounted on the bearing studs 31. Any suitable bearing may be employed, but in the illustrative embodiment there is shown a roller type bearing in which loose rollers are held in place by a spring steel plate 36, the plate having at one end a hole which fits over the end of the bearing stud 31 and at its other end a hole which passes over the crank pin 37 projecting from the outer face of the crank gear 34. For reasons which will appear hereinafter, the two crank gears 34 are rotatably displaced relative to each other by 180 degrees, that is, when one crank pin 37 is at its least or greatest distance from the motor shaft the other crank pin is similarly located with respect to the motor shaft.

Pivoted on each of the crank pins 37 is a bearing block 38. Desirably each of the crank gears 34 is balanced to compensate for the additional weight of the crank pin 37 and bearing block 38, which is all on one side of the bearing stud 31. Conveniently this will be done by removing some of the metal from the same side of the gear, preferably from the rear face thereof as shown at 39.

The block 38 on the crank pin of the upper crank gear 34 engages the slot 42 in a crosshead 43, and the block on the lower crank gear engages the slot 44 in a crosshead 45. Guide means are provided for the crossheads which permit reciprocating movement thereof, desirably along paths which substantially form an extension of each other. As shown, the crossheads are slidable along two vertical guide rods 46, both rods passing through spaced holes in each crosshead to prevent turning and twisting thereof and to insure smooth movement of the crossheads along the rods. The center lines of the slots 42 and 44 should be parallel to each other and normal to the plane passing through the axes of the two crank gears 34.

The guide rods 46 are mounted in a cover 47 for the forward end of the gear box 20. In the illustrative embodiment the cover is held in place on the gear box by four machine screws 48 passing through holes in the cover and engaging tapped holes in the side walls of the gear box. These tapped holes may be extensions of the tapped holes engaged by the screws 19 which attach the gear box to the housing 11.

Secured at its upper end to the upper crosshead 43 is a tubular saw ram 51, the lower end of which is slidably supported in a bearing 52 mounted in the lower end of the gear box cover 47. The saw ram may be secured in the crosshead by a screw-threaded connection, or by a pin 53, or by both.

The lower end of the ram 51 is designed to receive and hold a saw blade 54 with a bayonet type connection. The shaft end of the blade 54 is inserted into the slotted end of the ram and then given a quarter turn so that the wider portion 55 of the blade has its lower shoulder ends engaged with the upper sides of the stops 56 within the bore of the ram to prevent withdrawal of the saw blade from the ram. The blade then is locked in the ram by turning down the screw plug 57 until it presses firmly against the upper end of the saw blade, pressing the shoulder ends tightly against the stops. The screw plug 57 may be adjusted by a screw driver or wrench inserted into the upper end of the tubular ram through an opening 58 in the top of the cover 47. After the adjustment has been made the opening 58 will be closed, as by means of a screw.

For compactness in construction, and also to reduce vibration, the saw ram 51 passes downwardly in front of the pinion gear 33 and the lower crank gear 34. In order to avoid interference of the ram with the lower crosshead, the latter is shaped to clear the ram 51, as may be seen clearly in Figure 4. The mass of the lower crosshead 45 should be substantially equal to the combined mass of the upper crosshead 43, the saw ram 51 and the saw blade 54, and to this end the crosshead 45 may be extended latterly to both sides as indicated at 60.

Secured to the lower end of the gear box 20, as by means of screws 61, is a saw table or sleigh 62 which presses against the material being sawed when the saw is in operation and which moves over the surface thereof. This table 62 may be of convenient size and has its forward edge beveled or turned upwardly as shown at 63 so as to slide easily over the surface of the material being sawed. The forward edge of the saw table is slotted to receive the blade and to make it easier to guide the saw along its desired course. In operation, the saw teeth cut as they are moving toward the saw table, thus helping to hold the saw table in firm engagement with the material being sawed.

As can be seen in Figure 1, the lower end of the gear box 20 is shaped so that, in cooperation with the saw table 62, it provides an extension for the air channel 21 through which air is forced by the fan 25 when the motor is operating. The air is directed along the saw table past the saw blade at the point of sawing to blow away the sawdust and make it easy to follow the desired path with the saw.

In operation, rotation of the motor turns the pinion gear 33 on the end of the motor shaft and the pinion gear drives the similar crank gears 34 in opposite directions. The crank gears cause the crossheads 43 and 45 to move up and down, toward and away from each other, along the guide rods 46. Since the crank gears are rotatably displaced relative to each other by 180 degrees, the crossheads always will be moving at similar speeds, but in opposite directions. As the upper crosshead 43 moves it actuates the saw blade 54. Since the crank gears 34 are individually balanced and since the mass of the lower crosshead 45 equals the combined mass of the upper crosshead 43, the saw ram 51 and the saw blade 54, the movement of the lower, or idling counterbalancing, crosshead will set up an independent vibration substantially equal and opposite at all times to that set up by the upper crosshead. These vibrations oppose and substantially neutralize each other, practically eliminating vibration of the saw unit.

The saw speed will be determined by the sizes of the pinion gear 33 and the crank gears 34, and by the motor speed. For example, if the motor speed is 13,000 revolutions per minute and the gear ratio is 4 to 1, which is approximately that shown in the illustrative embodiment, the saw blade will make 3250 strokes per minute.

The invention herein disclosed may be variously modified and embodied within the scope of the subjoined claims.

I claim as my invention:

1. A motor driven, reciprocating-blade saw comprising, in combination, a motor enclosed with a housing small enough to be held in the hand, a gear box secured to and forming a closure for one end of the motor housing, a train of gears mounted within the gear box and operatively connected to the motor so as to be driven thereby, said gears including a pair of similar, driven crank gears rotatably mounted in the gear box on opposite sides of the motor axis with their axes parallel to the motor axis, a recessed cover for the gear box, a pair of movable crossheads within said cover, common guide means within said cover for the crossheads slidably engaged thereby and permitting limited movement of the crossheads toward and away from each other along a straight line located in the plane passing through the axes of the crank gears, said line being perpendicular to the motor axis, a crank pin extending from the face of each of the crank gears beyond the gear box into the recessed cover, a slot in each crosshead disposed perpendicular to its line of movement and facing toward one of the crank gears, a rectangular block slidably disposed in each of said slots engaged by the crank pin of the oppositely disposed crank gear, the crank pins and the rectangular blocks providing an operative connection between the crank gears and the crossheads to impart equal and opposite reciprocatory motion to the crossheads along the common guide means when the motor is operating, and a driven member connected at one end to one of the crossheads and passing through the wall of the gear box with its longitudinal axis parallel to the line of movement of the crossheads.

2. A motor driven, reciprocating blade saw comprising in combination, a motor housing small enough to be held in the hand, a motor enclosed within said housing, a horizontal motor driven shaft, a pinion gear carried by an end of said shaft, a gear carrying member secured to and forming a closure for the forward end of said housing, said member having a horizontal passage receiving said shaft with said pinion gear projected at the forward side of said member, a crank gear carried at the forward side of said member for rotation about a horizontal axis and in mesh with said pinion gear to be driven thereby, an eccentric crank carried by said crank gear and projecting forwardly therefrom, a recessed cover member removably secured upon the forward side of said gear carrying member having a rearwardly facing recess defined by a front wall, side walls, and upper and lower walls, said lower wall having a centrally disposed vertical passage, a tubular bearing sleeve fixed in said passage having its upper end vertically spaced from said upper wall, a vertically reciprocable saw ram slidable in said sleeve having an upper end portion within said recess and reciprocable in the space between said bearing sleeve and said upper wall, a horizontal cross-head having a central part to which said upper end portion of said ram is secured, said cross-head extending transversely an equal distance at each side of said ram and having at its rearwardly facing side a horizontal slot engaged by said crank of said crank gear, and said cross-head having a pair of vertical bearing passages respectively equally spaced transversely at each side of said ram, and a pair of vertical guide rods fixed at their ends to said upper and lower walls and respectively slidably received in said vertical bearing passages, whereby constant three point bearing support is provided for said ram and cross-head during reciprocation respectively along said ram by said bearing sleeve and at each side of said cross-head by said guide rods.

3. A motor driven, reciprocating blade saw comprising in combination, a motor housing small enough to be held in the hand, a motor enclosed within said housing, a horizontal motor driven shaft, a pinion gear carried by an end of said shaft, a gear carrying member secured to and forming a closure for the forward end of said housing, said member having a horizontal passage receiving said shaft with said pinion gear projected at the forward side of said member, a pair of crank gears carried at the forward side of said member for rotation about horizontal axes, said crank gears being on opposite sides of and in mesh with said pinion gear to be driven thereby, an eccentric crank carried by each of said crank gears and projecting forwardly therefrom, a recessed cover member removably secured upon the forward side of said gear carrying member having a rearwardly facing recess defined by a front wall, side walls, and upper and lower walls, said lower wall having a centrally disposed vertical passage, a tubular bearing sleeve fixed to said passage having its upper end vertically spaced from said upper wall, a vertically reciprocable saw ram slidable in said sleeve having an upper end portion within said recess and reciprocable in the space between said bearing sleeve and said upper wall, a horizontal cross-head having a central part to which said upper end portion of said ram is secured, said cross-head extending transversely an equal distance at each side of said ram and having at its rearwardly facing side a horizontal slot engaged by said crank of one of said crank gears, and said cross-head having a pair of vertical bearing passages respectively equally spaced transversely at each side of said ram, a pair of vertical guide rods fixed at their ends to said upper and lower walls and respectively slidably received in said vertical bearing passages, whereby constant three point bearing support is provided for said ram and cross-head during reciprocation respectively along said ram by said bearing sleeve and at each side of said cross-head by said guide rods, and a second horizontal cross-head having a pair of vertical bearing passages in which said guide rods are respectively slidably received and having at its rearwardly facing side a horizontal slot engaged by said crank of the other of said crank gears.

HAROLD S. FORSBERG.

References Cited in the file of this patent

UNITED STATES PATENTS

| Number | Name | Date |
|---|---|---|
| 812,507 | Ludewig | Feb. 13, 1906 |
| 1,420,342 | Richard | June 20, 1922 |
| 1,542,127 | Hastings | June 16, 1925 |
| 1,623,290 | Wappat | Apr. 5, 1927 |
| 1,700,114 | Thompson | Jan. 22, 1929 |
| 1,708,345 | Wodak et al. | Apr. 9, 1929 |
| 1,833,785 | Krieger | Nov. 24, 1931 |
| 2,138,862 | Johnston | Dec. 6, 1938 |
| 2,282,728 | Kern | May 12, 1942 |
| 2,345,383 | Curtis | Mar. 28, 1944 |
| 2,408,567 | Mauch | Oct. 1, 1946 |
| 2,501,631 | Oschwald | Mar. 21, 1950 |